United States Patent
Sadouski

(10) Patent No.: US 9,032,329 B2
(45) Date of Patent: May 12, 2015

(54) SYSTEM AND METHOD FOR DIALOG POSITION MANAGEMENT

(75) Inventor: Siarhei Sadouski, Irvine, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1642 days.

(21) Appl. No.: 11/690,727

(22) Filed: Mar. 23, 2007

(65) Prior Publication Data

US 2008/0235618 A1 Sep. 25, 2008

(51) Int. Cl.
*G06F 3/0481* (2013.01)

(52) U.S. Cl.
CPC .................................... *G06F 3/0481* (2013.01)

(58) Field of Classification Search
CPC .... G06F 3/0481; G06F 3/048; G06F 3/03548
USPC ................. 715/810–845, 808–809, 788–801, 715/786–787, 777
See application file for complete search history.

(56) References Cited

U.S. PATENT DOCUMENTS

| | | | | |
|---|---|---|---|---|
| 4,931,783 A * | 6/1990 | Atkinson | ....................... | 345/163 |
| 5,202,961 A * | 4/1993 | Mills et al. | ..................... | 715/720 |
| 5,428,733 A * | 6/1995 | Carr | .............................. | 715/809 |
| 5,467,448 A * | 11/1995 | Hilton et al. | ................... | 715/235 |
| 5,500,936 A * | 3/1996 | Allen et al. | .................... | 715/808 |
| 5,644,737 A * | 7/1997 | Tuniman et al. | ............. | 715/810 |
| 5,644,739 A * | 7/1997 | Moursund | ..................... | 715/840 |
| 5,659,693 A * | 8/1997 | Hansen et al. | ................. | 715/779 |
| 5,680,561 A * | 10/1997 | Amro et al. | .................... | 715/787 |
| 5,712,995 A * | 1/1998 | Cohn | ............................. | 715/792 |
| 5,731,801 A * | 3/1998 | Fukuzaki | ...................... | 715/842 |
| 5,745,717 A * | 4/1998 | Vayda et al. | ................... | 715/834 |
| 5,808,610 A * | 9/1998 | Benson et al. | ................. | 715/788 |
| 5,819,055 A * | 10/1998 | MacLean et al. | ............. | 715/798 |
| 5,825,357 A * | 10/1998 | Malamud et al. | ............. | 715/779 |
| 5,883,626 A * | 3/1999 | Glaser et al. | ................... | 715/788 |
| 5,914,714 A * | 6/1999 | Brown | .......................... | 715/866 |
| 6,072,486 A * | 6/2000 | Sheldon et al. | ............... | 715/835 |
| 6,166,736 A * | 12/2000 | Hugh | ............................ | 715/798 |
| 6,229,539 B1 * | 5/2001 | Morcos et al. | ................ | 715/808 |
| 6,252,594 B1 * | 6/2001 | Xia et al. | ....................... | 715/786 |
| 6,590,593 B1 * | 7/2003 | Robertson et al. | ............ | 715/782 |
| 6,606,101 B1 * | 8/2003 | Malamud et al. | ............. | 715/715 |
| 6,667,751 B1 * | 12/2003 | Wynn et al. | .................... | 715/833 |
| 6,686,938 B1 * | 2/2004 | Jobs et al. | ...................... | 715/835 |
| 6,691,138 B1 * | 2/2004 | Kirkpatrick et al. | .......... | 707/204 |
| 6,717,596 B1 * | 4/2004 | Nason et al. | ................... | 715/788 |
| 6,853,390 B1 * | 2/2005 | Wandersleben et al. | ...... | 715/802 |
| 6,944,829 B2 * | 9/2005 | Dando | .......................... | 715/798 |
| 6,957,395 B1 * | 10/2005 | Jobs et al. | ...................... | 715/765 |
| 7,127,685 B2 * | 10/2006 | Canfield et al. | ............... | 715/842 |
| 7,134,093 B2 * | 11/2006 | Etgen et al. | .................... | 715/786 |
| 7,213,051 B2 * | 5/2007 | Zhu et al. | ...................... | 709/205 |
| 7,434,177 B1 * | 10/2008 | Ording et al. | ................. | 715/862 |
| 7,478,338 B2 * | 1/2009 | Yanchar et al. | ............... | 715/773 |
| 7,490,295 B2 * | 2/2009 | Chaudhri et al. | ............. | 715/764 |

(Continued)

*Primary Examiner* — Amy Ng
*Assistant Examiner* — William Wong

(57) ABSTRACT

A system, method, and computer program for managing objects within an application, comprising receiving information corresponding to a command accessed through a user interface; and in response to the received information, clipping said received information to one or more rail clips wherein said rail clip is positioned along said dialog rail in a computer window environment and appropriate means and computer-readable instructions.

20 Claims, 7 Drawing Sheets

(56) References Cited

U.S. PATENT DOCUMENTS

| | | | |
|---|---|---|---|
| 7,552,401 B2* | 6/2009 | Guido et al. | 715/838 |
| 7,561,145 B2* | 7/2009 | Garside et al. | 345/173 |
| 2002/0054144 A1* | 5/2002 | Morris-Yates | 345/809 |
| 2002/0122066 A1* | 9/2002 | Bates et al. | 345/786 |
| 2002/0154173 A1* | 10/2002 | Etgen et al. | 345/833 |
| 2002/0186252 A1* | 12/2002 | Himmel et al. | 345/787 |
| 2003/0063126 A1* | 4/2003 | Yanchar et al. | 345/781 |
| 2003/0210274 A1* | 11/2003 | Subramanian et al. | 345/809 |
| 2004/0095397 A1* | 5/2004 | Nojima et al. | 345/838 |
| 2004/0237049 A1* | 11/2004 | Pletcher et al. | 715/760 |
| 2004/0261037 A1* | 12/2004 | Ording et al. | 715/788 |
| 2005/0060656 A1* | 3/2005 | Martinez et al. | 715/751 |
| 2005/0154995 A1* | 7/2005 | Miller et al. | 715/772 |
| 2005/0210403 A1* | 9/2005 | Satanek | 715/786 |
| 2006/0036946 A1* | 2/2006 | Radtke et al. | 715/711 |
| 2006/0161859 A1* | 7/2006 | Holecek et al. | 715/781 |
| 2006/0253777 A1* | 11/2006 | Yalovsky | 715/530 |
| 2007/0016859 A1* | 1/2007 | Burago et al. | 715/538 |
| 2007/0038949 A1* | 2/2007 | Chan et al. | 715/767 |
| 2007/0094597 A1* | 4/2007 | Rostom | 715/700 |
| 2007/0162953 A1* | 7/2007 | Bolliger et al. | 725/142 |
| 2008/0016456 A1* | 1/2008 | Friedland et al. | 715/771 |
| 2008/0034318 A1* | 2/2008 | Louch et al. | 715/781 |
| 2008/0046840 A1* | 2/2008 | Melton et al. | 715/825 |
| 2008/0052637 A1* | 2/2008 | Ben-Yoseph et al. | 715/800 |

* cited by examiner

SYSTEM AND METHOD FOR DIALOG POSITION MANAGEMENT

TECHNICAL FIELD

The presently preferred embodiment of the innovations described herein relate generally to software applications. More specifically, the presently preferred embodiment relates to managing dialog boxes within a windowed graphical environment.

BACKGROUND

Today it is very common for users of computer software to encounter various portions of the software that are outside the typical work area. For example, a word processing application will not only have a blank page upon which to type but also a menu bar or other viewable tool bars to provide commands with other features. Likewise, a graphics application will not only have a blank canvass upon which to draw but also a menu bar and other tool bars with various commands to perform a multitude of functions. Regardless of the menu bar displayed, there are a number of buttons associated with the menu bar, e.g., File, Edit, View, etc. Each menu bar button will have various commands associated with it that can be displayed after a mouse click on the button. For example, when clicking the File menu button, listed commands can be "New, Open, Close, Save, etc." A commonly used convention places an ellipse ( . . . ) after the listed command to indicate to the user that if that command is clicked, then a dialog box will open somewhere on the computer screen and will include additional parts from which to choose. For example, when clicking Edit→Find, a "Find and Replace" dialog box appears for me to enter text to search in the current document.

There are two types of dialog boxes, modal and non-modal. The former temporarily halt the program in the sense that the user cannot continue working until the dialog box is closed, for example, "New→Open" causes the program to halt until the user chooses a file to open or cancels the command. The later type of dialog box, non-modal or modeless, is used when the requested command is not essential to continue, and so the dialog box can remain open while the user continues to work, for example, a "Colors" command that allows the user to dynamically change colors of various items while working.

This same set of actions occurs in countless programs, most notably graphics programs and computer aided drafting (CAD) applications. In graphics programs and CAD applications, it is not uncommon to heavily utilize various dialog boxes for commands such as color selection or tool manipulation in various modeless dialog boxes. However, all too often, these dialog boxes appear at random areas on the workspace and often times obscure workable portions of the screen until reoriented for usability.

What is needed is a system and method for managing modeless dialog boxes within a computer windows environment such that the dialog boxes could be docked at a predetermine location and easily manipulated without obscuring the workspace area utilized in the current software application.

SUMMARY

To achieve the foregoing, and in accordance with the purpose of the presently preferred embodiment as broadly described herein, the present application provides a method for managing objects within an application, comprising: receiving information corresponding to a command accessed through a user interface; and in response to the received information, clipping said received information to a rail clip wherein said rail clip is positioned along said dialog rail in a computer window environment. The method, further comprising re-positioning said rail clip following a plurality of position inputs. The method, further comprising re-aligning said received information on said rail clip when re-positioning said rail clip at a 50%/50% workspace ratio. The method, further comprising positioning the rail clip along the dialog rail in the computer window environment. The method, further comprising unclipping said received information from said rail clip to cause said received information to float in said computer windows environment. The method, wherein said received information is a dialog box. The method, wherein said received information is one of a menu and a sub-menu. The method, further comprising positioning said dialog rail to at least one tab stop in said computer window environment. The method, further comprising aligning said received information on said rail clip in one of a left-aligned location and a right-aligned location.

Another advantage of the presently preferred embodiment is to provide a computer-program product tangibly embodied in a machine readable medium to perform a method for managing objects within an application, comprising instructions operable to cause a computer to: receive information corresponding to a command accessed through a user interface; and in response to the received information, clip said received information to a rail clip wherein said rail clip is positioned along said dialog rail in a computer window environment. The computer-program product, further comprising instructions operable to cause a computer to re-position said rail clip following a plurality of position inputs. The computer-program product, further comprising instructions operable to cause a computer to re-align said received information on said rail clip when re-positioning said rail clip at a 50%/50% workspace ratio. The computer-program product, further comprising instructions operable to cause a computer to position the rail clip along the dialog rail in the computer window environment. The computer-program product, further comprising instructions operable to cause a computer to unclip said received information from said rail clip to cause said received information to float in said computer windows environment. The computer-program product, wherein said received information is a dialog box. The computer-program product, wherein said received information is one of a menu and a sub-menu. The computer-program product, further comprising instructions operable to cause a computer to position said dialog rail to at least one tab stop in said computer window environment. The computer-program product, further comprising instructions operable to cause a computer to align said received information on said rail clip in one of a left-aligned location and a right-aligned location.

And another advantage of the presently preferred embodiment is to provide an information manager, comprising a displayable defined region that accepts received information; and one or more docking locations positioned along said defined region; whereby information received from a command execution is associated with said docking location. The information manager, wherein said defined region extends a length of a computer window environment. The information manager, wherein said defined region is a dialog rail. The information manager, wherein said docking location is a rail clip. The information manager, wherein said received information is a dialog box.

And yet another advantage of the presently preferred embodiment is to provide a system comprising a windowed environment; and an application using said windowed environment that includes: a menu bar with access to a plurality of dialog boxes; a rail clip to provide a clipping location for said plurality of dialog boxes; and a dialog rail upon which said rail clip moves along at least one plane of said application to rapidly position said dialog boxes in a preferred location to facilitate interaction within a workspace area and an optional resource area.

And still another advantage of the presently preferred embodiment is to provide a data processing system having at least a processor and accessible memory to implement a method for managing objects within an application, comprising means for receiving information corresponding to a command accessed through a user interface; and in response to the received information, means for clipping said command to said rail clip.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 6:
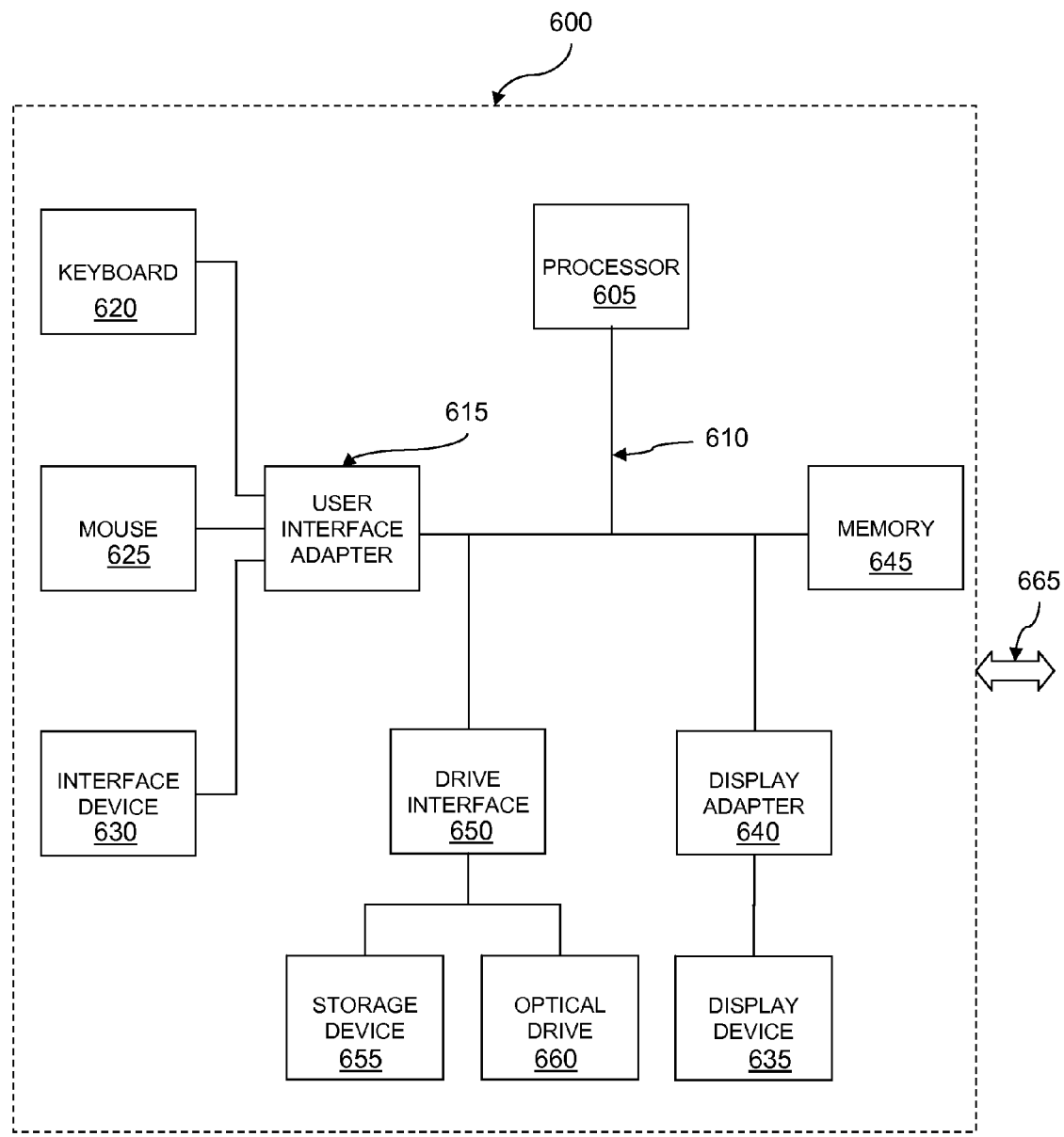
FIG. 6 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for managing non-modal dialog boxes within a computer window environment. Now therefore, in accordance with the presently preferred embodiment, an operating system executes on a computer, such as a general-purpose personal computer. FIG. 6 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Referring to FIG. 6, an exemplary system for implementing the presently preferred embodiment includes a general-purpose computing device in the form of a computer 600, such as a desktop or laptop computer, including a plurality of related peripheral devices (not depicted). The computer 600 includes a microprocessor 605 and a bus 610 employed to connect and enable communication between the microprocessor 605 and a plurality of components of the computer 600 in accordance with known techniques. The bus 610 may be any of several types of bus structures including a memory bus or memory controller, a peripheral bus, and a local bus using any of a variety of bus architectures. The computer 600 typically includes a user interface adapter 615, which connects the microprocessor 605 via the bus 610 to one or more interface devices, such as a keyboard 620, mouse 625, and/or other interface devices 630, which can be any user interface device, such as a touch sensitive screen, digitized pen entry pad, etc. The bus 610 also connects a display device 635, such as an LCD screen or monitor, to the microprocessor 605 via a display adapter 640. The bus 610 also connects the microprocessor 605 to a memory 645, which can include ROM, RAM, etc.

The computer 600 further includes a drive interface 650 that couples at least one storage device 655 and/or at least one optical drive 660 to the bus. The storage device 655 can include a hard disk drive, not shown, for reading and writing to a disk, a magnetic disk drive, not shown, for reading from or writing to a removable magnetic disk drive. Likewise the optical drive 660 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 600.

The computer 600 can communicate via a communications channel 665 with other computers or networks of computers. The computer 600 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 645 of the computer 600. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System

Figure 1:
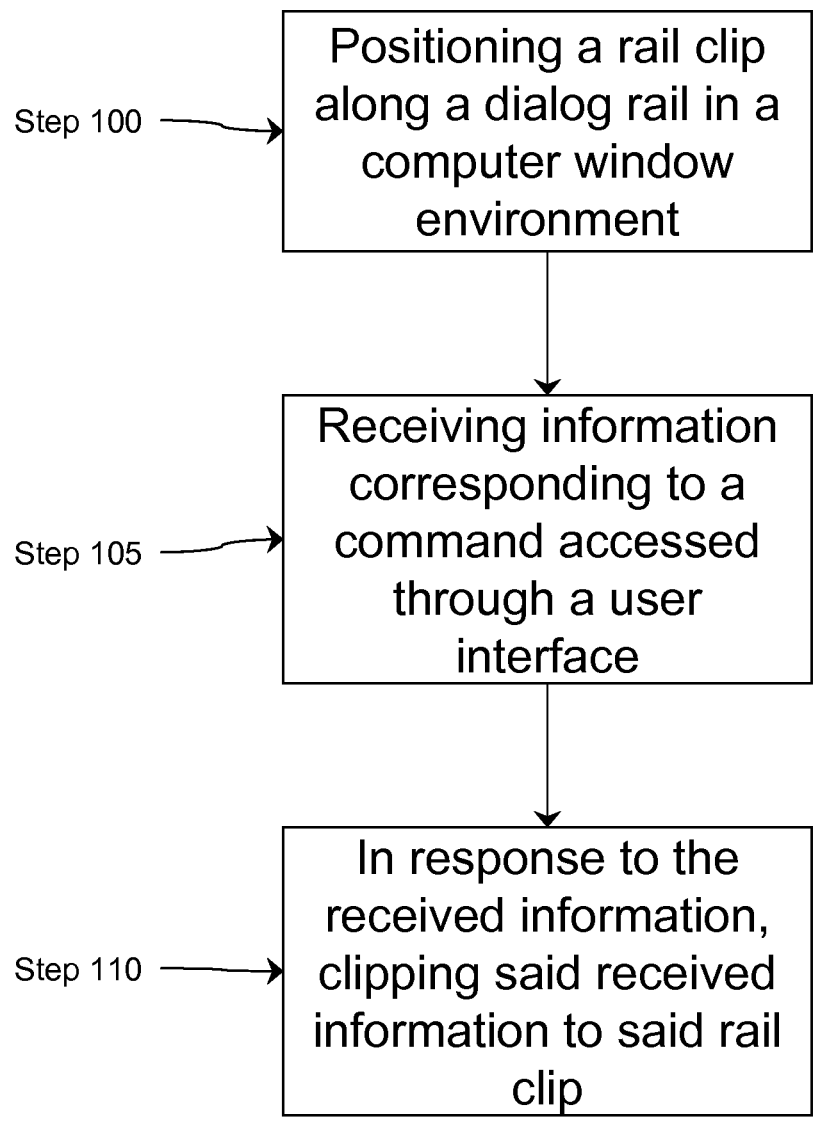
FIG. 1 is a process implementing an example dialog box management system.

FIG. 1 is a process implementing an example dialog box management system. Referring to FIG. 1, position a rail clip along a dialog rail in a computer window environment (Step 100). The position of the rail clip can occur by default at the start-up of an application, or based on a saved template, or prior access document, although any known or understood method for retrieving application information is available to position the rail clip at a position on the dialog rail. Receive information corresponding to a command accessed through a user interface (Step 105). As will be explained in greater detail below, the command presents a non-modal dialog box to a user for accessing commands available within the application for further use. In response to the received information, clip the dialog box to the rail clip (Step 110). By clipping the dialog box onto the dialog rail, the user then has the ability to position the dialog box anywhere along the rail that is desirable at any give time during application use. Movement along the rail is controlled by any commonly known input response means, e.g., mouse, keyboard, speech-recognition, etc. This list is by no means meant to be exhaustive, but is simply illustrative and it is understood that other means of input are equally foreseen in this application and are incorporated herewith.

Operation

Figure 2:
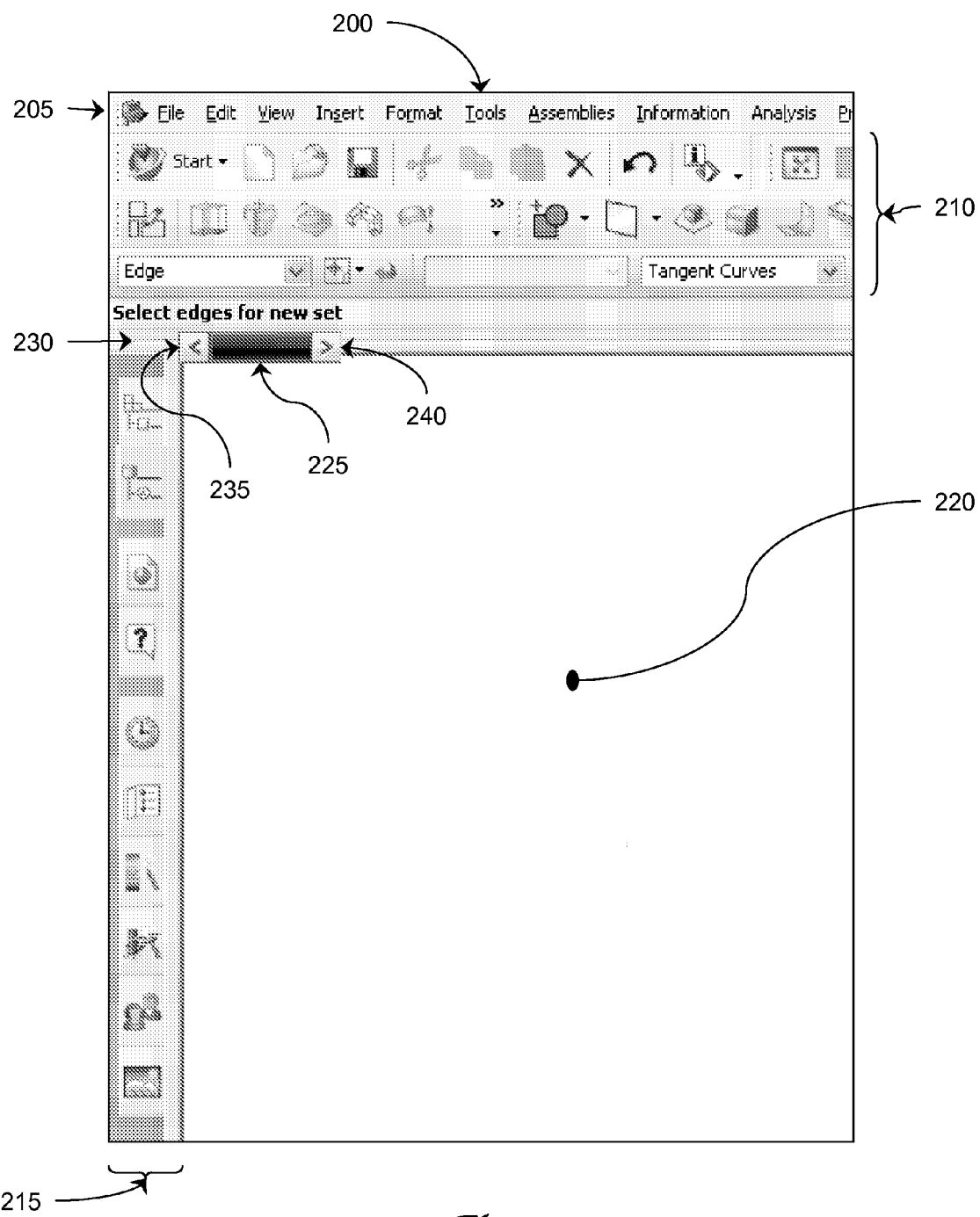
FIG. 2 shows an example dialog box management system with a rail clip and a dialog rail.

FIG. 2 shows an example dialog box management system with a rail clip and a dialog rail. Referring to FIG. 2, an user interface 200 displayed in a computer window environment executed on the computer 600 illustrates a menu bar 205 and a number of tool bars 210. There is also a resource bar 215 positioned next to a workspace 220, where it is illustrated to the left of the workspace 220 but can be placed anywhere on the user interface 200, depending upon preferential settings. As illustrated, located between the number of tool bars 210 and a region comprising the resource bar 215 and the workspace 220 is a rail clip 225 positioned on a dialog rail 230. Located on the rail clip 225 are a number of rail clip buttons such as a move left button 235 and a move right button 240 that moves the rail clip 225 to predefined tab-stop positions along the dialog rail 230. Additional rail clip buttons can include a clip/unclip button, a reset button, a show/hide collapsed groups button, and/or a close button, among others. The dialog rail 230 is a displayable defined region of the user interface 200. The rail clip is one or more docking locations positioned along the displayable defined region, and associates received information with the docking location.

Figure 3C:
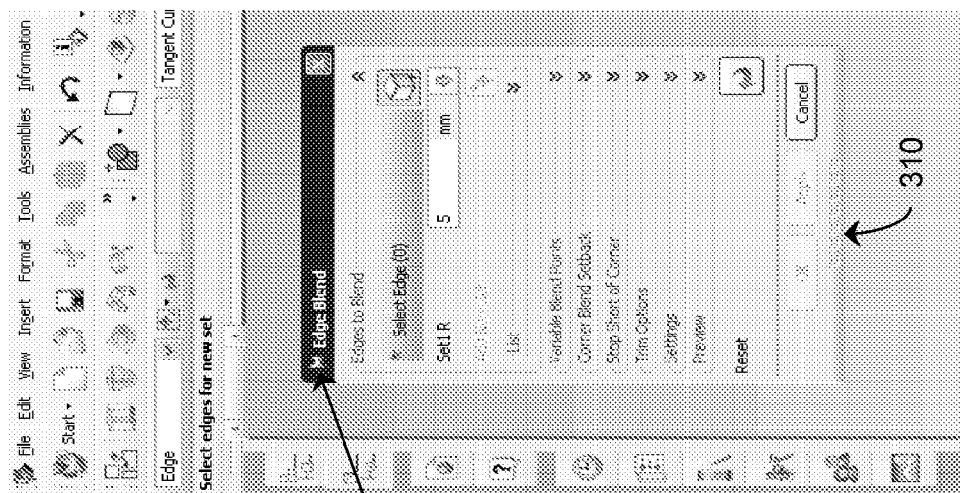
FIG. 3 shows another example of a dialog box management system with a dialog box, rail clip and a dialog rail.
Figure 3B:
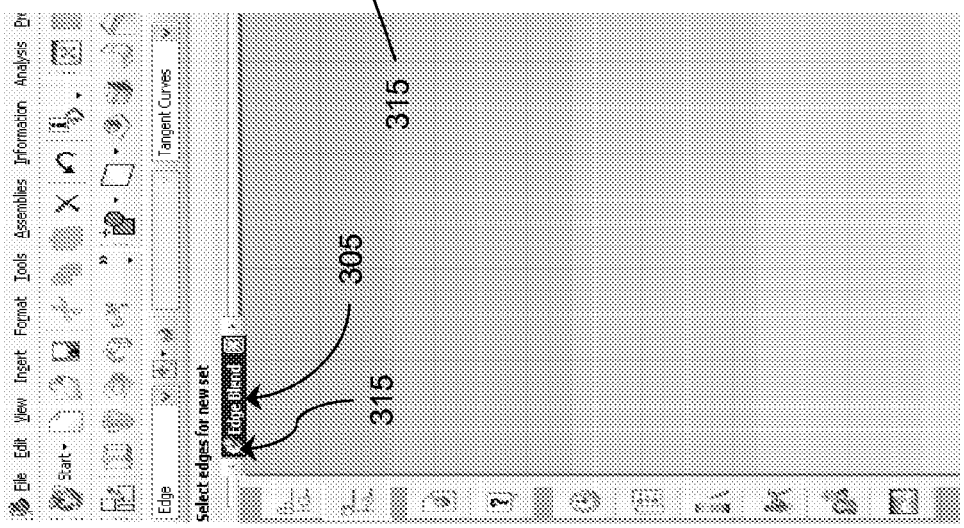
Figure 3A:
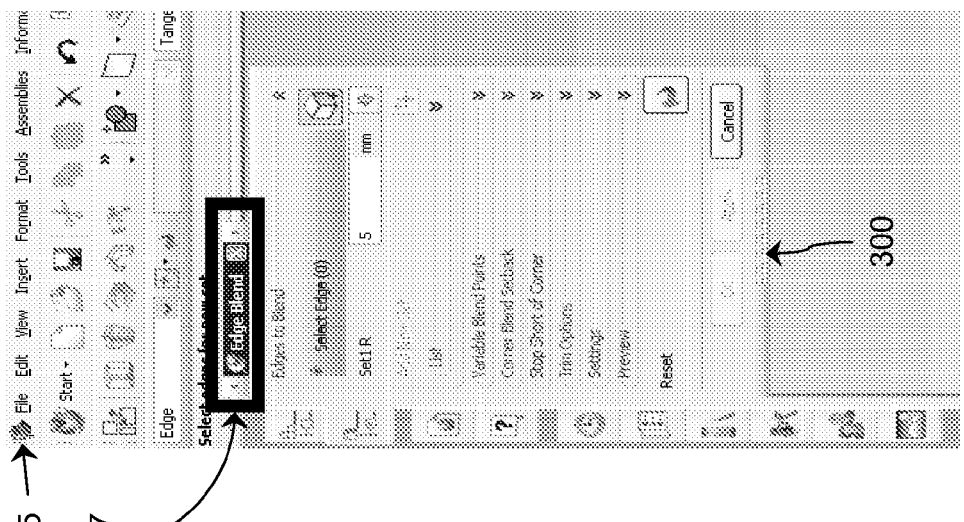
Figure 4A:
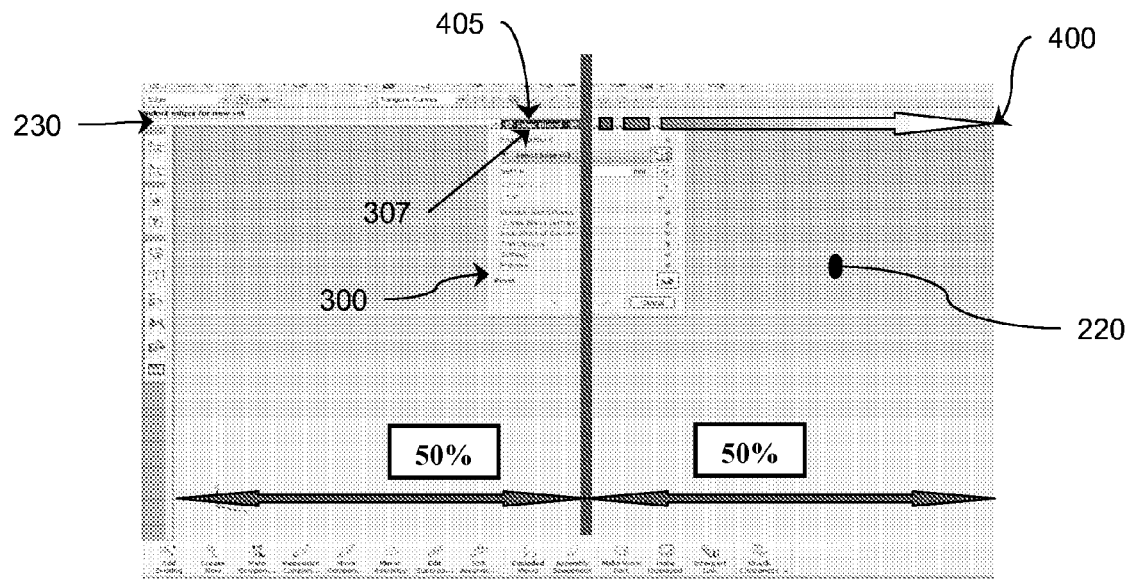
FIG. 4 shows the example dialog box management system of FIG. 3 where the dialog box is moved from location to location.
Figure 4B:
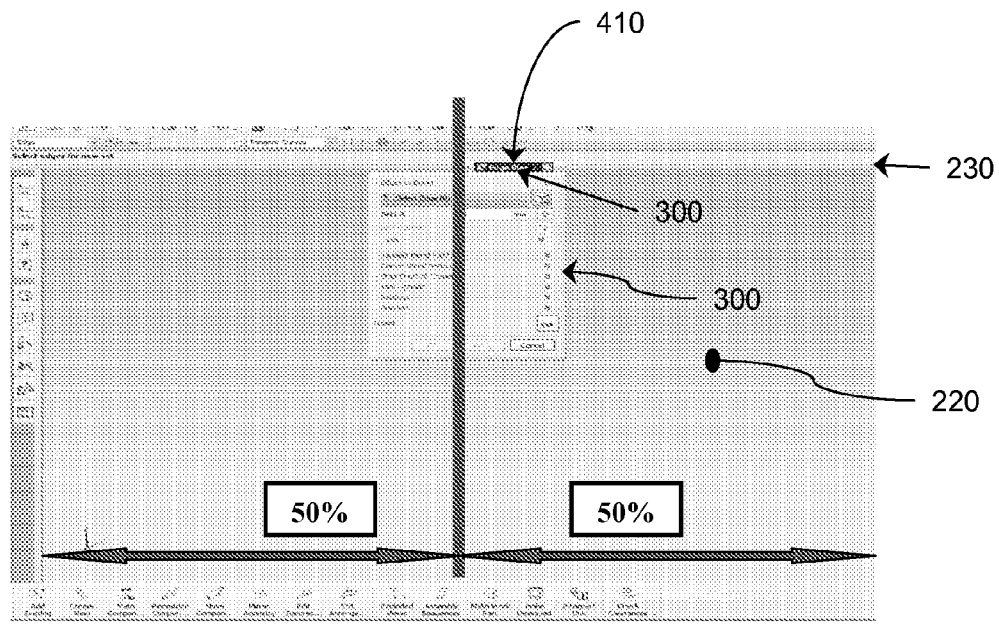
Figure 4C:
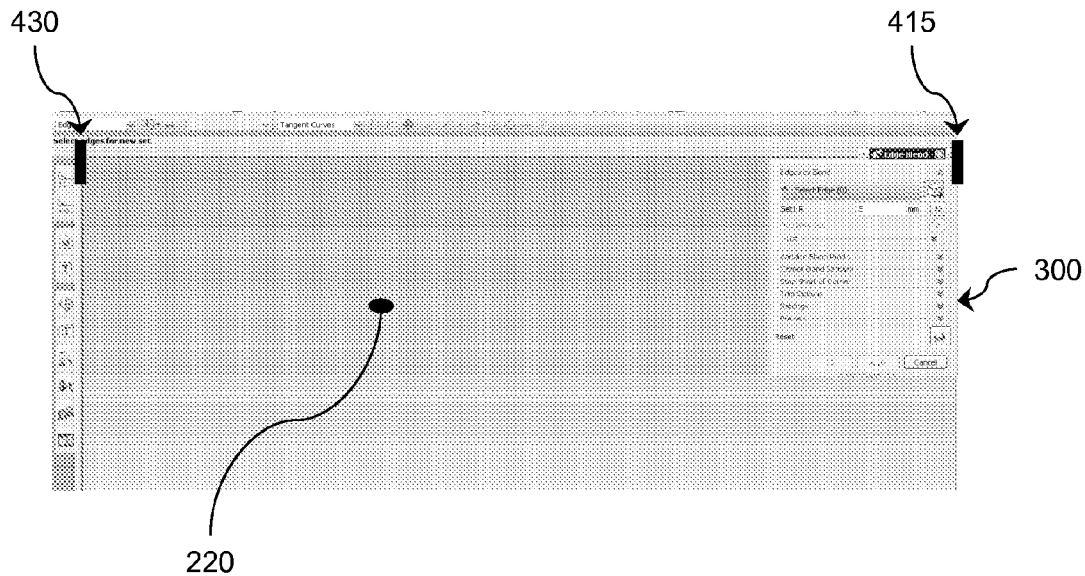
Figure 4D:
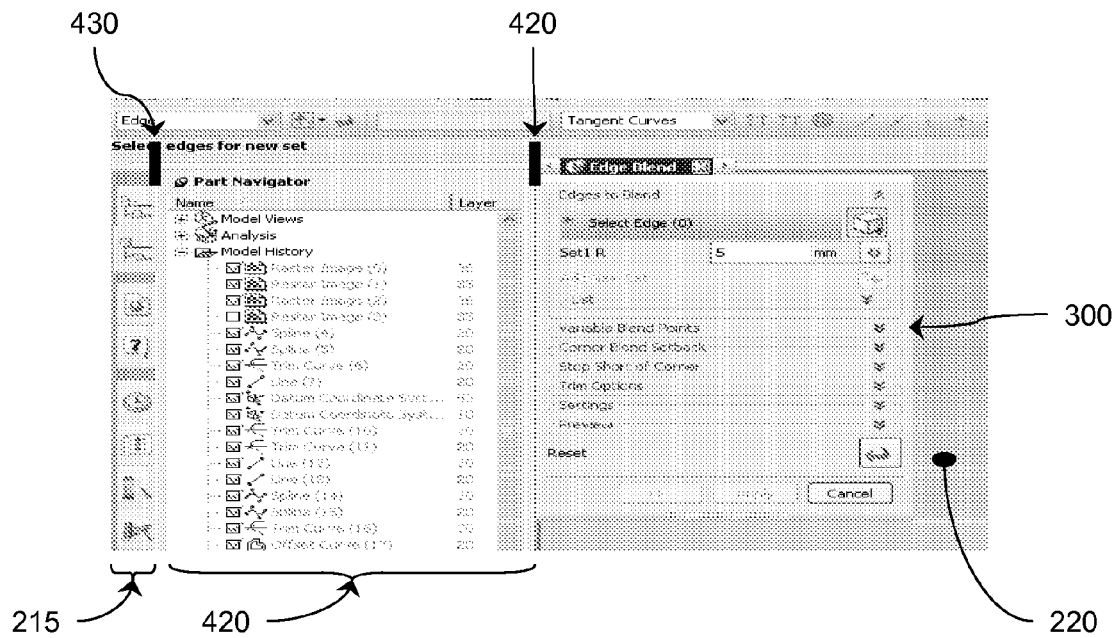

FIG. 3 shows another example of a dialog box management system with a dialog box, rail clip and a dialog rail. It is commonly known in the art of windowed programming that when a button on the menu bar 205, such as File or Tools or Insert, as a command with an ellipse ( . . . ) located next to the command, then the ellipse is an indication that the accessed command will display received information in the form of a dialog box 300. Referring to FIG. 3, accessing the Tools button on the menu bar 205 displays the edge blend command with an ellipse that, when executed, presents the dialog box 300 for the edge blend command. The presented dialog box snaps, or clips, the dialog box 300 to the rail clip 225 wherever the rail clip 225 is currently positioned on the dialog rail 230. The dialog box 300 can also transition to a hide state 305 by a mouse click on a title bar 307 of the rail clip 225, or other input to indicate the hide state, e.g., a keyboard short cut or voice command. The hide state 305 means the dialog box is no longer visible on the user interface 200 and retracts to the title bar 307, Another single mouse click on the title bar 307 with the dialog box 300 in the hide state 305 will unhide the dialog box 300 for viewing and use within the user interface 200. Further to the functionality of the dialog box 300, there is the ability to place it in an unclipped state 310 by selecting a clip/unclip button 315 where the dialog box behaves as a normal dialog box. Not illustrated in the Figures is the ability to stretch the width of the dialog box 300 when clipped to the rail clip 225 by clicking and dragging the left and right border utilizing techniques commonly understood in the industry. Regardless, the rail clip 225 is always moveable along the dialog rail 230 that extends to the extreme edges of the application window.

FIG. 4 shows the example dialog box management system of FIG. 3 where the dialog box is optionally moved from location to location. Referring to FIG. 4, the user has the ability to move the dialog box 300 clipped to the rail clip 225 in a horizontal fashion 400 along the dialog rail 230 by performing what is commonly known as a "click and drag" function on the title bar 307. As the rail clip 225 moves along the dialog rail 230, the title bar 307 automatically aligns itself to the dialog box 300 in a left-aligned orientation 405 or a right-aligned orientation 410. The left-aligned and right-aligned orientations (405,410) depend upon which side of the workspace 220 the rail clip 225 is located—based on a 50/50 area ratio of the workspace 220. As shown in FIG. 4a, when the dialog box 300 is on the left 50% of the workspace 220, the title bar 307 is in left-aligned orientation 405 with respect to the dialog box 300. And as shown in FIG. 4b, when the dialog box 300 is on the right 50% of the workspace 220, the title bar 307 is in the right-aligned orientation 410 with respect to the dialog box 300.

Referring further to FIG. 4, particularly 4c and 4d, the move right button 240 can be used to position the rail clip 225 at pre-determine tab stops to the right of the dialog box 300, for example, at the extreme edge of the application window indicated at 415. The move left button 235 can be used to position the rail clip 225 at pre-determine tab stops to the left of the dialog box 300, for example, at a palette border 420 located where the workspace 220 and a palette 425 meet, or a resource border 430 located where the palette 425 (or alternatively, the workspace 220 if no palette 425 present) and the resource bar 215 meet. When the rail clip 225 is located at the resource border 430 tab stop, the associated dialog box 300 will then appear on top of the palette 425 obscuring the user's view of the palette 425, when present.

Figure 5:
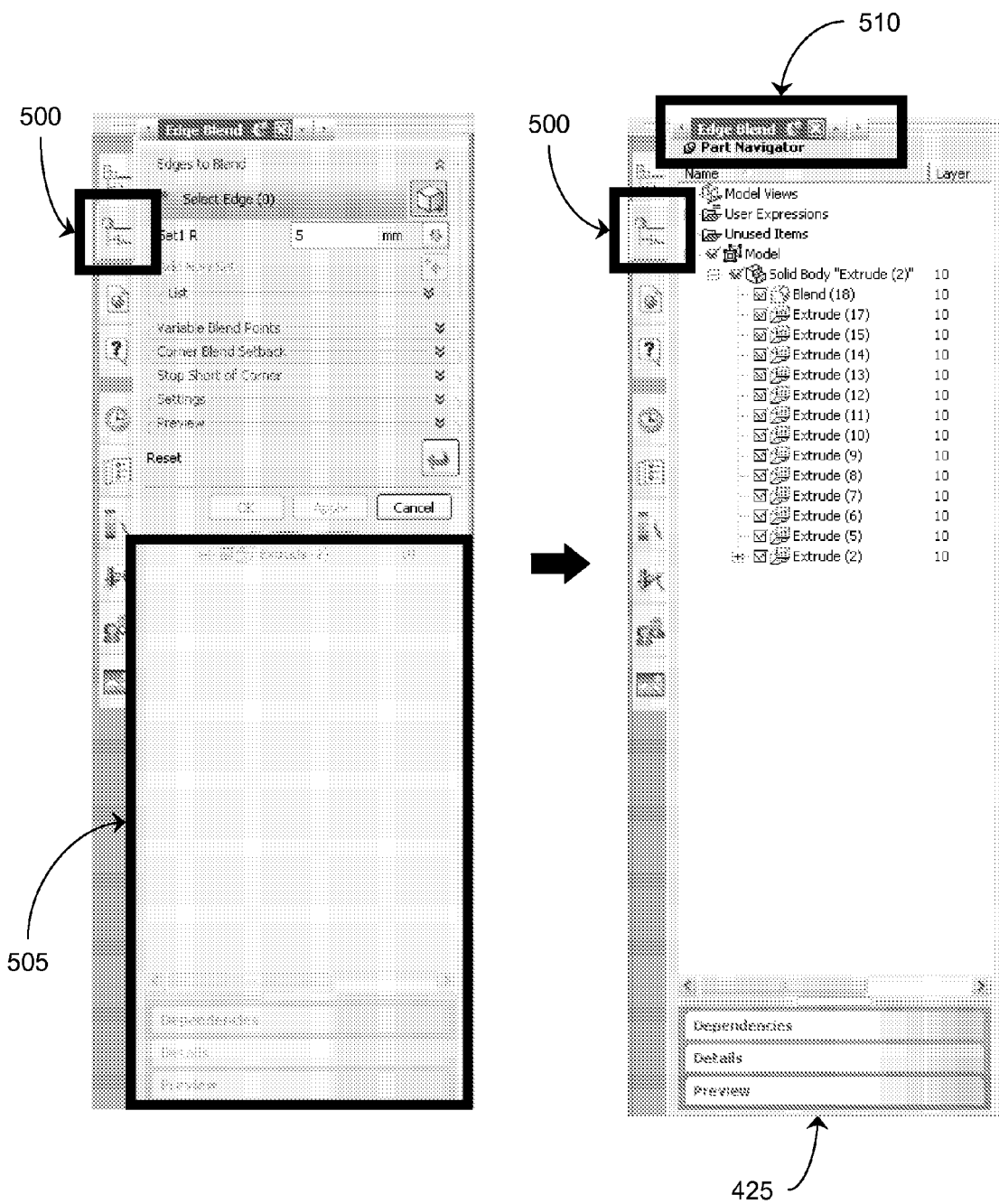
FIG. 5 shows the example of the dialog box management system interacting with a palette.

FIG. 5 shows the example of the dialog box management system interacting with a palette. Referring to FIG. 5, the dialog box 300 is located at the resource border 430 and obscures the palette 425 activated to show a part navigator 500, where the obscured palette is indicated at 505 as dimmed or grayed-out in appearance. The user can choose to then hide, generally shown at 510, the dialog box 300 in the manner previously discussed to activate the palette 425 that shows the part navigator 500 for use by the user. Alternatively, the user could predefine the behavior of the dialog box 300 in a preference or settings portion of the application that will always dim the palette 425 when the rail clip 225 is at the resource border 430 position, for example.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment, such as placing the dialog bar at any location relative to the workspace 220, such as below it or to the right or to the left or floating above or submerged below. For example, if the dialog rail 230, and associated rail clip 225, are located at the bottom of the region comprising the workspace 220, the commands will expand upwards from the dialog rail 230. Also, more than one dialog box may be opened at the same time and can all be on the same rail clip, or positioned on numerous rail clips. Further there can be more than dialog rail associated with the application that has one or more rail clips each, thereby making it possible to open as many dialog boxes to attach to the rail clips as the user has space on the computer windowed environment. Therefore, other implementations are within the scope of the following claims.

What is claimed is:

1. A method for managing objects within an application, comprising:
   receiving information corresponding to a command accessed by a computer and through a user interface; and
   in response to the received information, clipping said received information, by the computer, to one or more rail clips positioned along a dialog rail in a computer window environment, wherein said one or more rail clips are repositionable by a user along the dialog rail, and wherein said received information is displayed in a left-aligned format when clipped on a left half of a workspace and is displayed in a right-aligned format when clipped on a right half of the workspace.

2. The method of claim 1, further comprising re-positioning one of said one or more rail clips following a plurality of position inputs.

3. The method of claim 2, further comprising re-aligning said received information on said one of said one or more rail clips when re-positioning said one of said one or more rail clips at a 50%/50% workspace ratio.

4. The method of claim 1, further comprising positioning one of the one or more rail clips along the dialog rail in the computer window environment.

5. The method of claim 1, further comprising unclipping said received information from one of said one or more rail clips to cause said received information to float in said computer window environment.

6. The method of claim 1, wherein said received information is a dialog box.

7. The method of claim 1, wherein said received information is one of a menu and a sub-menu.

8. The method of claim 1, further comprising positioning said dialog rail to at least one tab stop in said computer window environment.

9. The method of claim 1, further comprising aligning said received information on one of said one or more rail clips in one of a left-aligned location and a right-aligned location.

10. A non-transitory machine readable medium encoded with instructions operable to cause a computer to:
    receive information corresponding to a command accessed through a user interface; and
    in response to the received information, clip said received information to one or more rail clips positioned along a dialog rail in a computer window environment, wherein said one or more rail clips are repositionable by a user along the dialog rail, and wherein said received information is displayed in a left-aligned format when clipped on a left half of a workspace and is displayed in a right-aligned format when clipped on a right half of the workspace.

11. The non-transitory machine readable medium of claim 10, further comprising instructions operable to cause the computer to re-position one of said one or more rail clips following a plurality of position inputs.

12. The non-transitory machine readable medium of claim 11, further comprising instructions operable to cause the computer to re-align said received information on said one of said one or more rail clips when re-positioning said one of said one or more rail clips at a 50%/50% workspace ratio.

13. The non-transitory machine readable medium of claim 10, further comprising instructions operable to cause the computer to position one of the one or more rail clips along the dialog rail in the computer window environment.

14. The non-transitory machine readable medium of claim 10, further comprising instructions operable to cause the computer to unclip said received information from one of said one or more rail clips to cause said received information to float in said computer window environment.

15. The non-transitory machine readable medium of claim 10, wherein said received information is a dialog box.

16. The non-transitory machine readable medium of claim 10, wherein said received information is one of a menu and a sub-menu.

17. The non-transitory machine readable medium of claim 10, further comprising instructions operable to cause the computer to position said dialog rail to at least one tab stop in said computer window environment.

18. The non-transitory machine readable medium of claim 10, further comprising instructions operable to cause the computer to align said received information on one of said one or more rail clips in one of a left-aligned location and a right-aligned location.

19. A computer system comprising:
    a display;
    a windowed environment displayed by the computer system on the display; and
    an application using said windowed environment that includes:

a menu bar with access to a plurality of dialog boxes;

a rail clip to provide a clipping location for one of said plurality of dialog boxes; and a dialog rail to which said rail clip is clipped and upon which said rail clip moves along at least one plane of said application to position said one of said plurality of dialog boxes in a preferred location to facilitate interaction within a workspace area and an optional resource area, wherein said one of said plurality of dialog boxes is displayed in a left-aligned format when positioned in a left half of a workspace and is displayed in a right-aligned format when positioned in a right half of the workspace.

20. A data processing system comprising a processor and accessible memory, the data processing system configured to perform the steps of:

receiving information corresponding to a command accessed through a user interface;

in response to the received information, clipping said command to a rail clip on a dialog rail in a left-aligned format when clipped on a left half of a workspace and in a right-aligned format when clipped on a right half of the workspace; and thereafter repositioning the rail clip along the dialog rail in response to a user input.

* * * * *